(12) United States Patent
Harper et al.

(10) Patent No.: US 8,639,855 B2
(45) Date of Patent: Jan. 28, 2014

(54) INFORMATION COLLECTION AND STORAGE FOR SINGLE CORE CHIPS TO 'N CORE CHIPS

(75) Inventors: Michael W. Harper, Round Rock, TX (US); Larry S. Leitner, Austin, TX (US); Mack W. Riley, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 12/254,261

(22) Filed: Oct. 20, 2008

(65) Prior Publication Data

US 2010/0100357 A1  Apr. 22, 2010

(51) Int. Cl.
| | | |
|---|---|---|
| *G06F 3/00* | (2006.01) | |
| *G06F 5/00* | (2006.01) | |
| *G06F 13/12* | (2006.01) | |
| *G06F 11/00* | (2006.01) | |
| *G11C 29/00* | (2006.01) | |
| *G01R 31/28* | (2006.01) | |
| *G05B 9/02* | (2006.01) | |
| *H01L 29/10* | (2006.01) | |
| *G06F 17/40* | (2006.01) | |

(52) U.S. Cl.
USPC ............ 710/15; 710/18; 710/36; 710/62; 714/25; 714/45; 714/47.1; 714/723; 714/724; 714/742; 700/79; 257/48; 702/187

(58) Field of Classification Search
USPC ............ 710/15, 36, 62, 18; 714/45, 723, 742, 714/25, 47.1; 700/79; 348/294; 455/411; 365/222; 257/48; 702/187
See application file for complete search history.

(56) References Cited

U.S. PATENT DOCUMENTS

| | | | | |
|---|---|---|---|---|
| 4,710,840 | A * | 12/1987 | Shepler et al. | 361/20 |
| 5,425,375 | A * | 6/1995 | Chin et al. | 600/549 |
| 5,535,223 | A | 7/1996 | Horstmann et al. | |
| 5,729,767 | A * | 3/1998 | Jones et al. | 710/62 |
| 6,081,752 | A * | 6/2000 | Benson et al. | 700/79 |
| 6,421,795 | B2 * | 7/2002 | Yamashita | 714/45 |
| 6,538,468 | B1 * | 3/2003 | Moore | 326/40 |

(Continued)

OTHER PUBLICATIONS

IEEE 1000 The Authoritative Dictionary of IEEE Standard Terms (Seventh Edition, 2000). p. 1123.*

(Continued)

*Primary Examiner* — Farley Abad
*Assistant Examiner* — Henry Yu
(74) *Attorney, Agent, or Firm* — Matthew B. Talpis; Gregory K. Goshorn; Greg Goshorn, P.C.

(57) ABSTRACT

Provided is a method for the collection and storage of information related to the operation of a chip module. The disclosed technology provides a chip data collection and storage controller. In one embodiment, a chip module is provided with a stand-alone memory that records information relevant to potential debugging operations. The stand-alone memory is on the same chip module as the chip die but is not part of the chip die. A data bus is provided between the chip module and the memory. In addition, the memory has I/O access so that information can be accessed in the event that the chip module cannot be accessed. Stored information includes, but is not limited to, environmental conditions, performance information, errors, time usage, run time, number of power on cycles, the highest temperature experience by the chip, wafer and x, y data, manufacturing info, FIR errors, and PRSO, SRAM PSRO values.

19 Claims, 6 Drawing Sheets

(56) References Cited

U.S. PATENT DOCUMENTS

| | | | |
|---|---|---|---|
| 6,717,429 B2* | 4/2004 | Whetsel | 324/750.3 |
| 6,861,866 B2 | 3/2005 | Han | |
| 6,894,308 B2* | 5/2005 | Whetsel et al. | 257/48 |
| 7,183,570 B2* | 2/2007 | Whetsel et al. | 257/48 |
| 7,183,789 B2* | 2/2007 | Whetsel | 324/762.03 |
| 7,491,970 B2* | 2/2009 | Whetsel et al. | 257/48 |
| 7,694,196 B2* | 4/2010 | Schnell et al. | 714/723 |
| 7,933,161 B2* | 4/2011 | Miyamoto et al. | 365/222 |
| 2002/0006676 A1* | 1/2002 | Debenham et al. | 438/14 |
| 2003/0098457 A1* | 5/2003 | Whetsel et al. | 257/48 |
| 2003/0122550 A1* | 7/2003 | Kanamaru et al. | 324/537 |
| 2005/0050245 A1* | 3/2005 | Miller et al. | 710/36 |
| 2005/0073598 A1* | 4/2005 | Fabinski et al. | 348/294 |
| 2005/0172272 A1* | 8/2005 | Bates et al. | 717/129 |
| 2005/0186726 A1* | 8/2005 | Whetsel et al. | 438/230 |
| 2006/0107159 A1* | 5/2006 | Krasilinec et al. | 714/742 |
| 2007/0004381 A1* | 1/2007 | Larson et al. | 455/411 |
| 2007/0051949 A1* | 3/2007 | Schneider et al. | 257/48 |
| 2007/0226482 A1* | 9/2007 | Borkar et al. | 713/100 |

OTHER PUBLICATIONS

Pham et al., "Key Features of the Design Methodology Enabling a Multi-Core SoC Implementation of a First-Generation Cell Processor," IEEE, pp. 871-878, 2006.

Baran et al., "Optimal Adaptive Algorithms for Finding the Nearest and Farthest Point on a Parametric Black-Box Curve," MIT Computer Science and Artificial Intelligence Laboratory, pp. 220-229, 2004.

* cited by examiner

INFORMATION COLLECTION AND STORAGE FOR SINGLE CORE CHIPS TO 'N CORE CHIPS

BACKGROUND

1. Technical Field

The claimed subject matter relates generally to semiconductor chips and, more specifically, to a method for facilitating the evaluation of a return material authorization chip.

2. Description of the Related Art

Components of semiconductor chips, or "chips modules," are typically manufactured in batches on wafers in which multiple dies are created and then separated for combination with other dies on a chip substrate. Over the past forty years, the design and manufacture of semiconductor chips have become increasing complicated as the chip modules have become smaller and more powerful. For example, a current chip module may have millions of transistors in the space occupied by one transistor forty years ago. Over the years, chip modules have gotten smaller and more powerful as both the number of dies produced on a particular wafer, the number of transistors on a particular die and the number of die mounted on a particular substrate have increased.

Each die and semiconductor chip must be tested before being released into the market. However, some flaws may be latent and may not be apparent in the initial testing stages. A latent defect may become worse over time and has the potential to create a chip failure that is observed by a customer. A return material authorization chip (RMA) is a die and the portion of the wafer substrate on which the die is mounted that has been returned to the manufacturer because the chip module failed to work properly in the customer environment. Of course, the increased number of dies on a particular substrate and increased transistor density increase the possibility that a latent defect may occur and the difficulty of analyzing the defective chip module.

A RMA, also know as "field returns," must be analyzed by an engineer or group of engineers to determine why the defective chip module did not perform to specification. This analysis typically must be performed with limited or no knowledge of such factors as the original location of a corresponding die on the manufacturing wafer, the operating condition of the chip module up to the time of failure and the customer's environment, such as the temperature at which the chip module was operated. This lack of knowledge ultimately ends up prolonging the time required for engineers to debug and find the root cause of the problem. In other words, valuable time is often lost simply establishing a starting point for the debugging of an RMA or other chip analysis.

Some single and multiprocessor servers include a separate processor that collects data on each of the other processors. However, when a processor is returned from such a single or multiprocessor server, the information collected by the separate processor is not included. In other words, even with respect to a server that collects processor data, a RMA does not include information that enables an engineer to debug an individual chip module.

Another issue with current chip design is that there is no way to determine the amount of usage corresponding to a chip module. This information could be useful for consumers when purchasing or maintaining products. For example, two similar devices, e.g. game devices, may be six months old and for sale. However, one of the devices may have been used a very small amount of time over the six months while the other device was used continuously. This information might be useful to a user determining which of the two game devices to purchase. Currently, there is no simple method for determining an amount of usage to which a particular electronic device has been subjected.

SUMMARY OF THE CLAIMED SUBJECT MATTER

Provided is a method for the collection and storage of environmental and operational information related to a semiconductor chip, or chip module, operating on a system board for a targeted application. The information collected is used to facilitate debugging of defective chip modules and to calculate usage data for a particular module. For a given return material authorization (RMA) chip module, there is often some piece of information that could be helpful in determining why the module does not meet expectations. Current chip designs simply do not provide the means to retrieve such information because the information is typically not stored in the first place. Even though many chip modules never need to be debugged, information collection may also be utilized for other operations as well, such as, but not limited to, semiconductor chip design and optimization.

The disclosed technology provides a chip data collection and storage controller (CDCSC) for addressing these issues. In one embodiment, a semiconductor chip is provided in which a chip substrate includes multiple dies and a memory, distinct from the dies, for recording information relevant to potential debugging operations. In other words, the non-volatile memory is mounted on the same substrate as the dies but is a distinct component. The memory may itself be manufactured as a die that is mounted on the substrate. A data bus is provided to read and write data between the dies and the memory. In addition, the memory has input/output (I/O) access so that stored information can be accessed in the event that the chip module cannot be accessed by conventional means.

In another embodiment, information related to chip module usage is stored according to the disclosed technology so that a customer can determine the amount of usage associated with a particular chip module. For example, a system administrator may set a policy of replacing any module that has exceeded a predetermined usage level. In this manner, informed decisions can be made concerning both the purchase of used equipment and the maintenance of existing equipment. In addition, the disclosed technology enables a manufacture to base a warranty upon usage associated with an electronic device rather than merely the age of the device.

The disclosed technology is applicable to single processor designs, multi-core processors designs, system on a chip (SOC) designs, any chip designs that have yet to be developed. Information that may be stored includes, but is not limited to, environmental conditions, performance information, errors, power on and power off cycles and time usage. For example, information can be stored on run time, number of power on cycles the each die of a particular chip module has executed, the highest temperature experience by the chip module, wafer and x, y data of a die (i.e. information concerning the die's original location among many dies on a manufacturing wafer), manufacturing info, performance screen ring oscillator (PRSO) values, synchronous random access memory (SRAM) PSRO values and fault isolation registers (FIR) errors.

Historical data can be stored to assist a chip manufacturing and design teams to understand the environmental effects on circuits over time. For example, items such as performance screen ring oscillators (PSROs) can be stored at the time the corresponding chip module or die is manufactured. At a future point in time, a PSRO value can be measured and compared to the value stored at manufacture to determine the improvement or degradation of the circuit with time.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE FIGURES

A better understanding of the claimed subject matter can be obtained when the following detailed description of the disclosed embodiments is considered in conjunction with the following figures, in which:

DETAILED DESCRIPTION OF THE FIGURES

Although described with particular reference to debugging a multi-core semiconductor chip, the claimed subject matter can be implemented with respect to any semiconductor chip, including single-core chips, in which the collection and storage of operation information is desirable, for either debugging or other purposes. Those with skill in the computing arts will recognize that the disclosed embodiments have relevance to a wide variety of computing environments and systems in addition to those described below. In addition, the methods of the disclosed technology can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic or semiconductor system, apparatus or device. Memory and recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for the collection and storage of chip and die operation information. The term "programmed method", as used herein, is defined to mean one or more process steps that are presently performed; or, alternatively, one or more process steps that are enabled to be performed at a future point in time. The term "programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Figure 1:
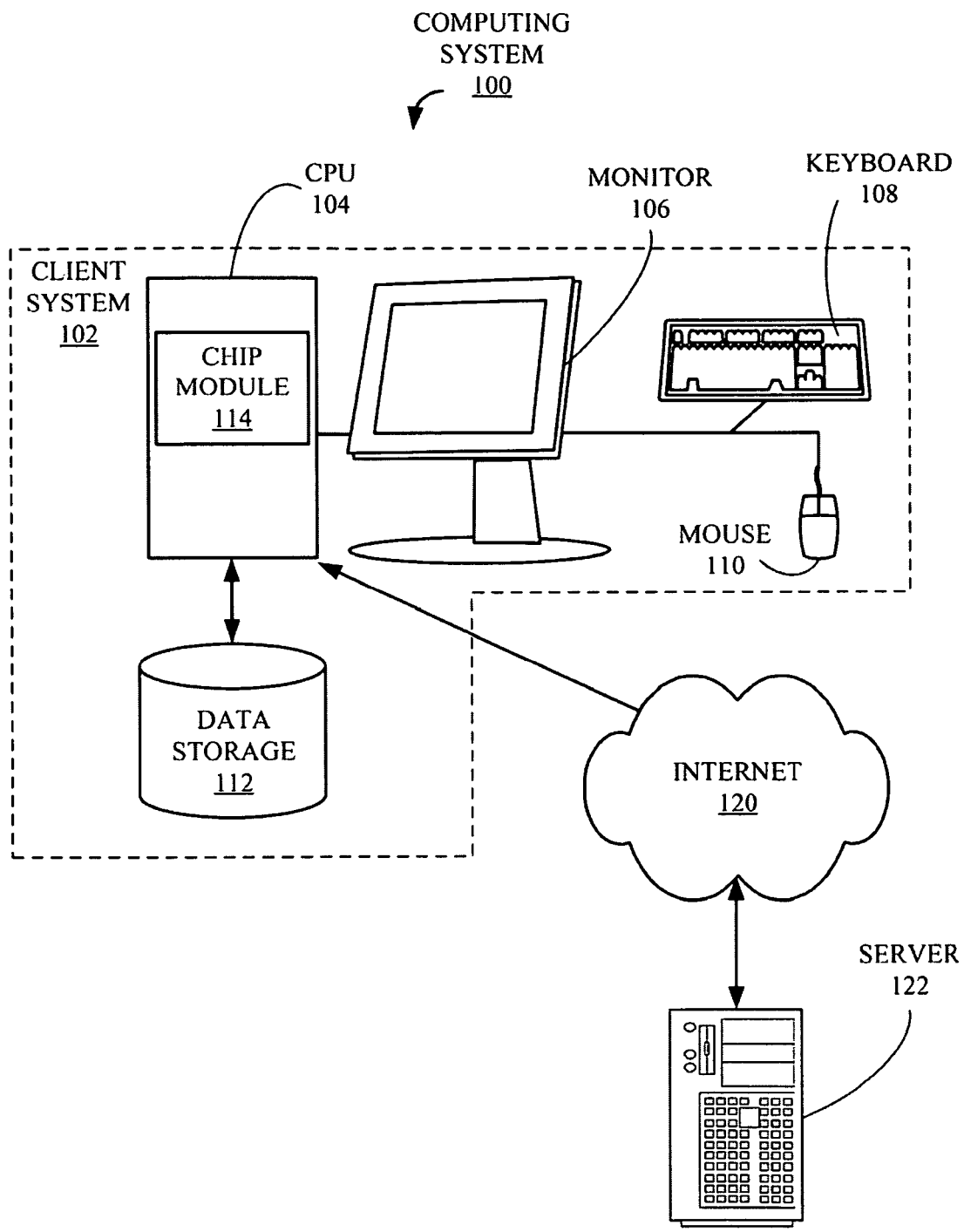
FIG. 1 is a block diagram of one example of a computing system that incorporates a semiconductor chip, or chip module, that incorporates the claimed subject matter.

Turning now to the figures, FIG. 1 is a block diagram of one example of a computing system 100 that incorporates a chip module 114 with a chip data collection and storage controller (CDCSC) 116 (see FIG. 2) according to the claimed subject matter. It should be understood that computing system 100 is only one example of a system that might incorporate a chip module with the disclosed technology and is employed for illustrative purposes only. Those with skill in the computing arts should appreciate that the claimed subject matter may be employed in almost any device that includes a processor, including but not limited to, computers, gaming devices, communication devices and so on.

A client system 102 includes a central processing unit (CPU) 104, coupled to a monitor 106, a keyboard 108 and a mouse 110, which together facilitate human interaction with computing system 100 and client system 102. Also included in client system 102 and attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown). CPU 104 includes a chip module 114, which incorporates a CDCSC in accordance with the claimed subject matter. It should be understood that a CPU such as CPU 104 typically includes multiple components, including possibly more than one semiconductor chip such as chip module 114. For the sake of simplicity, only chip module 114 is illustrated. Chip module 114 is described in more detail below in conjunction with FIG. 2.

Client system 102 and CPU 104 are connected to the Internet 120, which is also connected to a server computer 122. Although in this example, CPU 104 and server 122 are communicatively coupled via the Internet 120, they could also be coupled through any number of communication mediums such as, but not limited to, a local area network (LAN) (not shown). Further, it should be noted there are many possible computing system configurations, of which computing system 100 is only one simple example. As mentioned above, computing system 100 is merely employed as one example to illustrate various aspects of the claimed subject matter.

Figure 2:
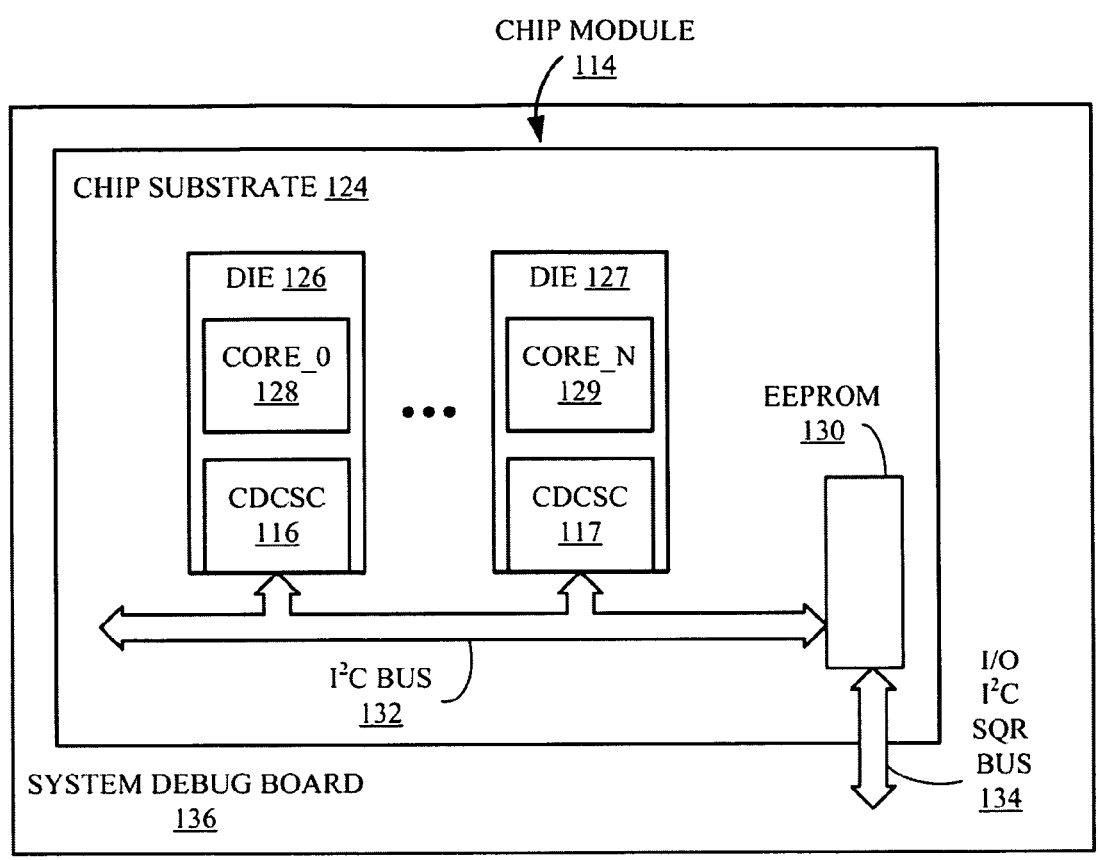
FIG. 2 is a block diagram of a multi-core semiconductor chip module, illustrated in FIG. 1 mounted in a computing system, mounted instead on a system debug board.

FIG. 2 is a block diagram of one example of chip module 114 (FIG. 1), mounted on a system debug board 136. Although chip module 114 is mounted in computing system 102 in FIG. 1, in FIG. 2, chip 114 has been removed from computing system 102 (FIG. 1) and remounted in a system debug board 136. In other words, chip module 114 has been removed from client system 102 and installed in system debug board 136 to facilitate the collection of information in accordance with the claimed subject matter. This action may be taken, for example, if a customer or user of client system 102 had experienced thought to originate with chip module 114. In this example, chip module 114 is a return material authorization (RMA) chip and engineers have mounted chip 114 on system debug board 136 to determine the source of a problem. It should be noted that different mountings of chip 114 are employed merely to illustrate different scenarios in which the claimed subject matter may be utilized and that the claimed subject matter also allows for the retrieval of information from chip module 114 while chip module 114 is mounted in client system 102 or even from a second computer such as server 122 (FIG. 1) over the Internet 120 (FIG. 1).

Chip module 114 is built on a chip substrate 124, which is a mounting surface for the various components of chip module 114. Chip substrate 124 also includes multiple connection points (not shown) for providing contact between the components of chip module 124 and the particular device on which chip module 114 is mounted, e.g. CPU 104 (FIG. 1) or system debug board 136. In this example, multiple dies, of which a die 126 and a die 127 are illustrated, are mounted on chip substrate 124. Dies may be mounted on a substrate laterally or vertically to create a chip module such as chip module 114. Die 126 includes a processing core, or core_0 128, and die 127 includes a processing core, or core_N 129. Although only one chip substrate 124, two processing dies 126 and 127 and two cores 128 and 129 are illustrated, chip module 114 could include multiple substrates and additional dies and processing cores. In addition, dies may include multiple processing cores.

Each of dies 126 and 127 also includes a CDCSC, or CDCSC 116 and 117, respectively. In this example, CDCSC 116 is a logical unit of chip die 126 and CDCSC 117 is a logical unit of chip die 127. In the alternative, CDCSCs 116 and 117 could each be separate die mounts on chip substrate 124 mounted by means of 3D packaging techniques. Those with skill in the chip manufacturing arts should be familiar with 3D packaging techniques and the multiple ways in which dies may be mounted on a chip substrate. It should be noted, that dies may have multiple processing cores but for the sake of simplicity, only one is illustrated in each of die 126 and 127.

In addition to dies 126 and 127, an electrically erasable programmable read-only memory (EEPROM) 130 is mounted on chip substrate 124. Memory 130 is also referred to as "companion" memory in that memory 130 is connected, or a companion, to CDCSCs 116, 117 and dies 127 and 128. In this example, EEPROM 130 is also a die mounted on chip substrate 124 although other configurations are possible. It should be understood that not just an EEPROM but almost any type of non-volatile data storage device could be employed to meet the requirements of the claimed subject matter. Typically, the specific storage device would be selected based upon cost, area and data retention and reliability requirements.

EEPROM 130 is communicatively coupled to CDCSCs 116 and 117 via an I²C data bus 132. Data bus 132 is primarily employed to move data from CDCSCs 116 and 117 to non-volatile data storage 130. Also coupled to EEPROM 130 is a second I²C data bus 134 which enables communication between EEPROM 130 and, in this example, system debug board 136. Data bus 134 is provided so that EEPROM 130 may be read in the event that dies 126 and/or 127 are inoperable. It should be understood that the interfaces between chip 114 and EEPROM 130 and between EEPROM 130 and system debug board 136 are not necessarily I²C data busses, i.e. many possible configurations are possible. In this example, the I²C data bus design is selected due to a low pin count, ease of implementation and because I²C is an industry standard interface. In addition, an alternative embodiment may employ one data bus rather than two, in which case an appropriate degree of isolation between communications is required.

Figure 3:
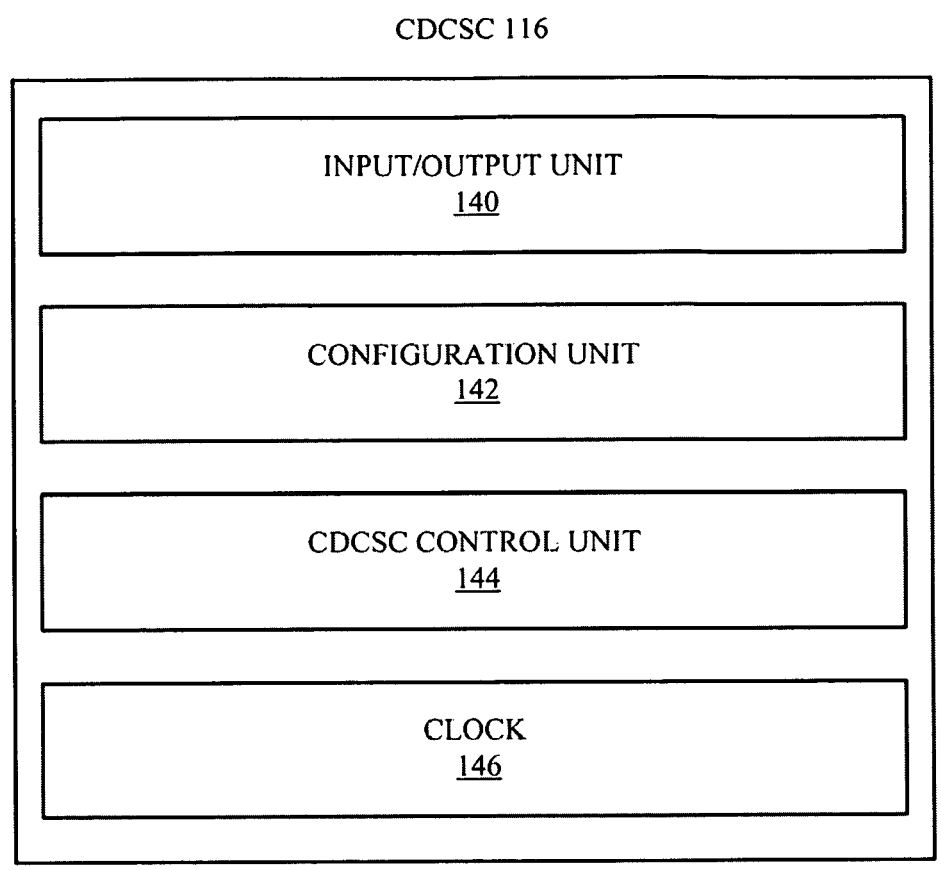
FIG. 3 is a block diagram of a chip data collection and storage controller (CDCSC), first introduced in FIG. 2, in more detail.

FIG. 3 is a block diagram of CDCSC 116 of FIGS. 1 and 2 in more detail. CDCSC 116 includes an Input/Output (I/O) unit 140, a configuration unit 142 a CDCSC control unit 144 and a clock 146. I/O unit 140 is responsible for communication between CDCSC 116 and both chip module 114 (FIGS. 1 and 2) and whatever means are employed to retrieve and transmit information to and from CDCSC 116 from locations other than chip module 114. In addition, I/O unit enables communication between CDCSC 116 and EEPROM 130 (FIG. 2). One example of a location other then chip 114 is system debug board 136 (FIG. 2). In addition, I/O unit 140 enables communication between CDCSC 116 and EEPROM 130. I/O module 140 is coupled to both I²C 132 (FIG. 2) and I²C 134 (FIG. 2).

Configuration unit 142 stores information relating to the configuration of CDCDC 116. Such information may include, but is not limited to, data on the device in which CDCSC 116 is installed and the various parameters that CDCSC 116 is configured to collect and store. Examples of data that CDCSC 116 is configured to collect and store include, but is not limited to, environmental conditions, performance information, errors and time, usage associated with chip module 114. Additional examples include run time information, number of power on cycles chip module 114 has executed, the highest temperature experience by chip module 114, wafer and x, y data of chip module 114, manufacturing info, performance screen ring oscillator (PRSO) values, synchronous random access memory (SRAM) PSRO values and fault isolation registers (FIR) errors. In one embodiment, collected data is stored in data storage 130.

CDCSC control unit 144 includes logic, which can be software, hardware or a combination of both, that controls the operation of CDCSC 116. Various process associated with CDCSC 116 are described in more detail below in conjunction with FIGS. 4-6. Clock 146 provides timing information independently of any system clocks (not shown) that may be associated with CPU 104 or chip module 114.

Figure 4:
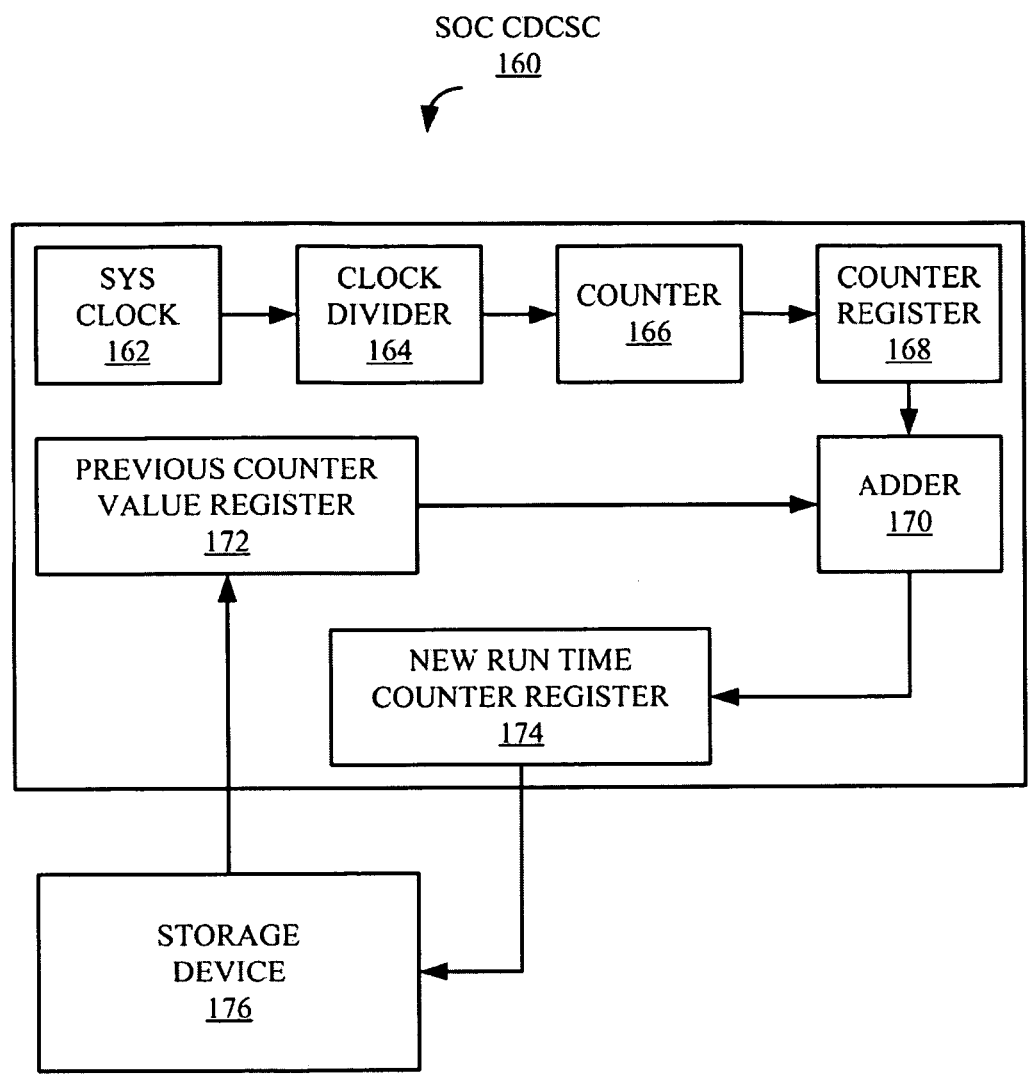
FIG. 4 is a block diagram of an example of a system on a chip (SOC) that implements one embodiment of a CDCSC.

FIG. 4 is a block diagram of an example of a system on a chip (SOC) CDCSC design 160 that represents a second embodiment of the claimed subject matter. In other words, SOC CDCSC 160 corresponds to CDCSC 116 (FIGS. 1-3) and a storage device 176 corresponds to EEPROM 130 (FIG. 2). FIG. 4 illustrates the collection and storage of one particular data element associated with a corresponding SOC (not shown), i.e. information related to a system ("sys") clock 162, which corresponds to clock 146 (FIG. 3). A clock divider 164 receives a signal from clock 162, processes the signal and transmits the processed signal to a counter 166. A value from counter 166 is stored in a counter register 168. In effect, clock divider 164 converts the original nanosecond based clock signal into values that are more meaningful to humans, i.e. seconds, minutes, etc.

An adder 170 combines a counter value from counter register 168 and a previous counter value register 172 to produce a value for storage in a new run time counter register 174. The value stored in register 174 is stored in off-chip storage device 176 and also stored in previous counter value register 172 to be transmitted to adder 170 during a subsequent timing cycle. It should be understood that the data generated by components 162, 164, 166, 168, 170, 172 and 174 and stored in storage device 176 are merely one example of information generated and stored in conjunction with the claimed subject matter. Those with skill in the art should appreciate the types of data that might be useful and the various components that would be necessary to generate such data.

In addition to providing information helpful during debugging operations, such data enables a user to determine an amount of usage associated with an electronic device configured in accordance with the disclosed technology. For example, a user is able to evaluate usage of two similar devices, such as a game box. Although both devices may have been in use for one year, one device could have been subjected to hundreds of hours of use and the other very little or no use. In this manner, a purchase price for each device may be established based upon actual usage rather than merely the age of the device.

Such usage information may also be employed by a manufacturer to set warranty limits. In addition to warranty usage limits. a manufacturer could determine whether or not a particular device had been, for example, subjected to extreme temperatures that would render the warranty void.

Figure 5:
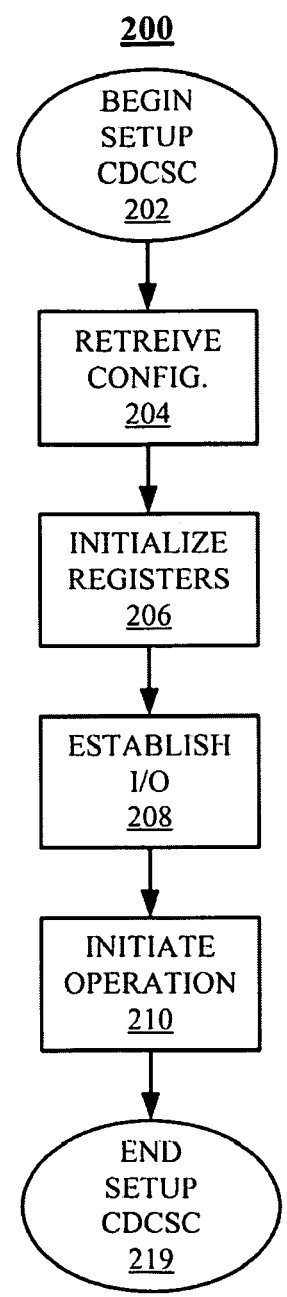
FIG. 5 is a flowchart of a Setup CDCSC process that implements one aspect of the claimed subject matter.

FIG. 5 is a flowchart of a Setup CDCSC process 200 that implements one aspect of the claimed subject matter. Process 200 is an example of a process that is executed when a CDCSC such as CDCSC 116 (FIGS. 1-3) and CDCSC 160 (FIG. 4) are powered up. This example is described with respect to CDCSC 116 and would be executed either when power is supplied to chip module 114 (FIG. 1) via computing system 102 (FIG. 1) or supplied to system debug board 136 (FIG. 2), depending upon which device 114 or 136 chip module 114 is mounted.

Process 200 starts in a "Begin Setup CDCSC" block 202 and proceeds immediately to a "Retrieve Configuration (ConFIG.)" block 204. During block 204 CDCSC control module 144 (FIG. 3) retrieves information necessary for operation from configuration unit 142 (FIG. 3). During an "Initialize Registers" block 206, process 200 initializes data registers that are internal to CDCSC.116. Although not shown with respect to CDCSC 116, CDCSC 160 (FIG. 4) illustrates some examples of such registers that are also employed in CDCSC 116.

During an "Establish I/O" block 208, CDCSC 116 initializes I/O unit 140 (FIG. 3) by establishing connections to cores 126-128 (FIG. 2), EEPROM 130 (FIG. 2) and either computing system 102 or system debug board 136, depending upon the current configuration. During an "Initiate Operation" block 210, normal operating processing associated with CDCSC 116 is initiated (see FIG. 6). Finally, process 200 proceeds to an "End Setup CDCSC" block 219 in which process 200 is complete.

Figure 6:
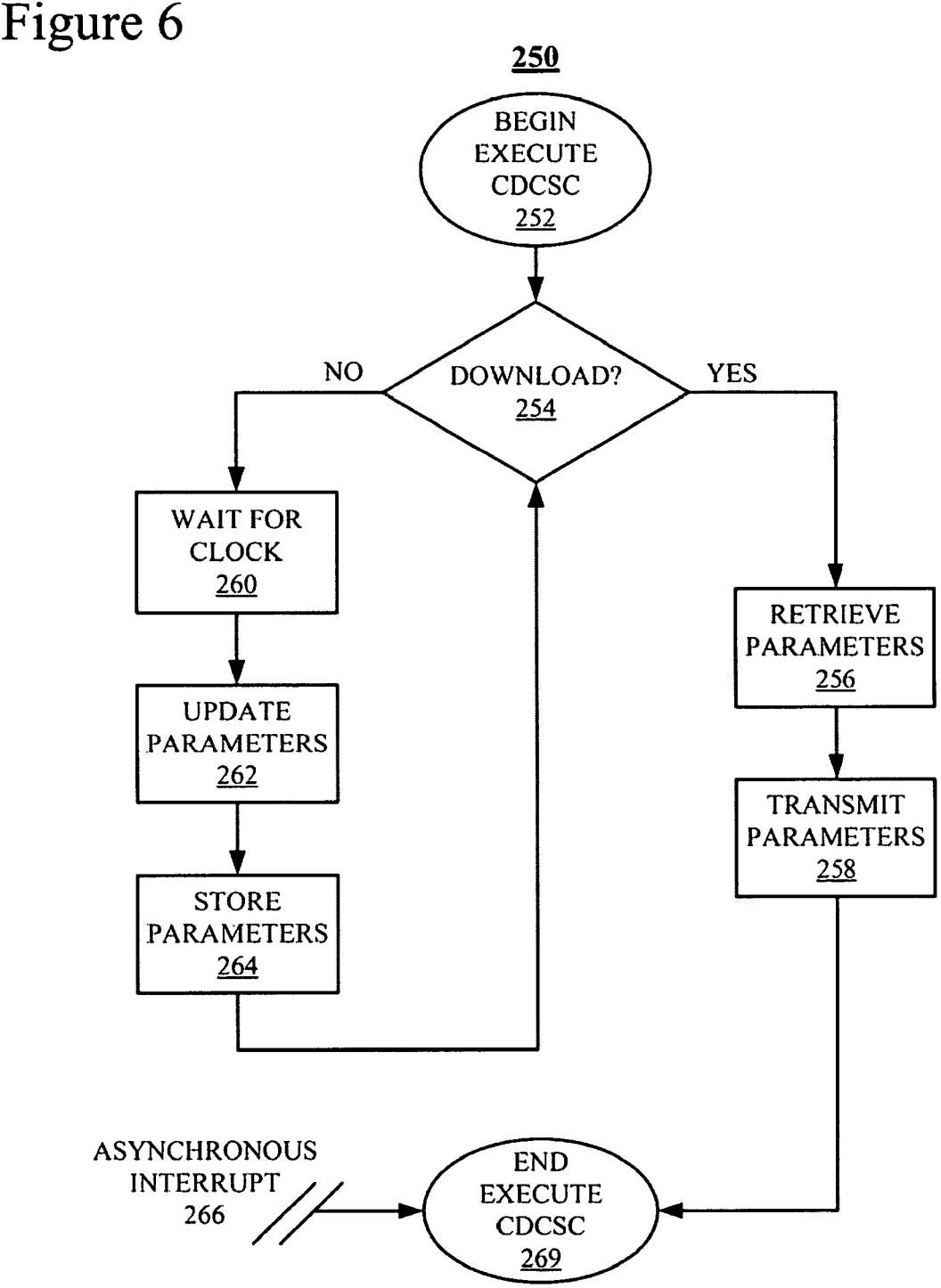
FIG. 6 is a flowchart of an Execute CDCSC process that implements a second aspect of the claimed subject matter.

FIG. 6 is a flowchart of an Execute CDCSC process 250 that implements a second aspect of the claimed subject matter. Process 250 executes on a CDCSC such as CDCSC 116 (FIGS. 1-3) and CDCSC 160 (FIG. 4). This example is described with respect to CDCSC 116 and would be executed in response to. Initiate Operation 210 of Setup CDCSC process 200, both described above in conjunction with FIG. 5.

Process 250 starts in a "Begin Execute CDCSC" block 252 and proceeds immediately to a "Download?" block 254. During block 254, process 250 determines whether or not CDCSC 116 is in a data download or a data gather mode. This determination is made by an examination of a parameter (not shown) associated with configuration unit 142 (FIG. 3), a parameter set in response to a signal form a user via I/O unit 140 (FIG. 3).

If process 250 determines that CDCSC 116 is in a download mode, control proceeds to a "Retrieve Parameters" block 256 during which data stored in EEPROM 130 (FIG. 2) is formatted for transmission to the party that has requested the data. It should be noted that stored data is retrievable regardless of whether CDCSC 116 is installed in computing system 102 (FIG. 1) or system debug board 136 (FIG. 2). In addition, provisions are provided to download data from EEPROM 130 even though CDCSC 116 and/or computer system 102 are inoperable. In this manner, a debugging operation may be conducted regardless of the condition of the corresponding equipment.

As explained above, examples of data that CDCSC 116 is configured to collect, store and download include, but is not limited to, environmental conditions, performance information, errors and time usage associated with chip module 114. Additional examples include run time information, number of power on cycles chip module 114 has executed, the highest temperature experience by chip module 114, wafer and x, y data of chip module 114, manufacturing info, performance screen ring oscillator (PRSO) values, synchronous random access memory (SRAM) PSRO values and fault isolation registers (FIR) errors. During a "Transmit Parameters" block 258, process 250 transmits the requested parameters retrieved during block 256 to the party that request them. Once parameters have been transmitted during block 258, control proceeds to an "End Execute CDCSC" block 269 in which process 250 is complete.

If, during block 254, process 250 determines that CDCSC 116 is not configured for a download operation, i.e. configured for nominal data collection, control proceeds to a "Wait for Clock" block 260. In this example, data collection is clock driven, i.e. periodically at a rate controlled by a parameter stored in conjunction with configuration unit 142, CDCSC 116, under the control of CDCSC control unit 144 (FIG. 3). Although in this example, a clock signal is received from clock 146 (FIG. 3), in the alternative CDCSC 116 may employ a signal from a clock associated with either computing system 102 or system debug board 136. Further, rather than being clock driven, i.e. "pulled," data collection could be "push oriented," i.e. transmitted by components of computer system 102, for example when target data is updated.

Once a signal to update is received, either pushed or pulled, during block 260, process 250 proceeds to an "Update Parameters" block 262. During block 262, process 250 generates the necessary data from the information received. During a "Store Parameters" block 264, process 250 stores the parameters received and updated during block 262 in memory 130.

Finally, process 240 is halted by means of an asynchronous interrupt 266, which passes control to an "End Execute CDCSC" block 269 in which process 250 is complete. Interrupt 266 is typically generated when the computing system or debug board on which CDCSC 116 is mounted is itself halted. During nominal operation, process 250 continuously loops through the blocks 254, 260, 262 and 264, processing clock signals and data as generated. It should be understood, process 250 is just one simple example of a data collection process associated with the disclosed technology. As explained above, many different operating parameters associated with chip module 114 may be collected and stored, some using similar collection procedures and some employing different procedures more suited to the corresponding parameters. In addition, multiple data collection procedures may execute concurrently.

While the claimed subject matter has been shown and described with reference to particular embodiments thereof, it will be understood by those skilled in the art that the foregoing and other changes in form and detail may be made therein without departing from the spirit and scope of the claimed subject matter, including but not limited to additional, less or modified elements and/or additional, less or modified blocks performed in the same or a different order.

We claim:

1. An apparatus, comprising:
a data processor die mounted on a chip substrate;
a non-volatile data storage die mounted on the chip substrate and distinct from the data processor die;
logic for the collection of data corresponding to an operational history of the data processor die;
a first data bus coupled to the data processor die and directly to the non-volatile data storage die;
logic for transmitting data collected by the logic for the collection of data to the data storage die over the first data bus; and
logic for accessing the collection of data on the data storage die via a second data bus coupled directly to the non-volatile data storage die, wherein the collected data is accessible via the second data bus while the data processor die and the first data bus are inoperable.

2. The apparatus of claim 1, wherein the logic for collection of data is incorporated into the data processor die.

3. The apparatus of claim 1, wherein the data storage die for collection of data is mounted on the chip substrate using 3D package techniques.

4. The apparatus of claim 1, the data corresponding to the operational history of the data processor the comprising:
a number of computing cycles executed by the data processor die; and
an elapsed power on time.

5. The apparatus of claim 1, the data corresponding to the operational history of the data processor die comprising:
environmental conditions associated with operation of the data processor die;
a time of a last power cycle;
a data and time of an error associated with the data processor die; and
error register values.

6. The apparatus of claim 1, wherein the non-volatile data storage die stores wafer, x, y data and a manufacturer code corresponding to the data processor die.

7. A method of collecting information related to a data processor die, comprising:
mounting a data processing die and a non-volatile data storage die on a chip substrate, wherein the data processor die and the non-volatile data storage die are mounted in distinctly different locations on the chip substrate;
incorporating a chip data collection and storage controller (CDCSC) into the data processor die;
collecting, by the CDCSC, data corresponding to the operational history of the data processor die;
storing the collected data on the non-volatile data storage die via a first data bus coupled to the non-volatile data storage die; and
accessing the collected data on the non-volatile data storage die via a second data bus coupled to the non-volatile data storage die;
wherein the collected data is accessible via the second data bus while the data processor die and the first data has are inoperable; and
wherein the first data bus is not coupled to the second data bus.

8. The method of claim 7, the collecting comprises interacting with circuits on the data processor die to collect temperature information, power cycle information and time of day information.

9. The method of claim 7, further comprising accessing the collected data from the non-volatile data storage die via the second data bus coupled to the data storage die.

10. The method of claim 7, wherein the operational history information is error information related to an internal failure of the data processor die.

11. The method of claim 7, further comprising debugging the data processor die based upon the collected data.

12. The method of claim 7, further comprising determining a usage history associated with the data processor die based upon the collected data.

13. The method of claim 7, further comprising calculating applicability of a warranty associated with the data processor die based upon the collected data.

14. An apparatus for the collection of information relating to a chip substrate, comprising:
a data processor die mounted on a chip substrate;
a non-volatile data storage die mounted on the chip substrate and distinct from the data processor die; and
a chip data collection and storage controller (CDCSC) incorporated into the data processor die, the CDCSC comprising:
logic for the collection of operational history data corresponding to the data processor die; and
logic transmitting data collected by the collection logic to the non-volatile storage die via a first data bus coupled directly to the non-volatile data storage die; and
logic for accessing the collected data die via a second data bus coupled directly to the non-volatile data. storage die, wherein the collection. of operational history data is accessible via, the second data bus while the data processor die and the first data bus are inoperable.

15. The apparatus of claim 14, wherein the e data storage die for collection of data is mounted on the chip substrate using 3D package techniques.

16. The apparatus of claim 14, the operational history data comprising:
a number of computing cycles executed by the data processor die; and
an elapsed power-on time.

17. The apparatus of claim 14, the operational history data comprising:
environmental conditions associated with operation of the data processor die;
a time of a last power cycle;
a data and time of an error associated with the data processor die; and
error register values.

18. the apparatus of claim 14, wherein the nonvolatile data storage die stores wafer, x y data and a manufacturer code corresponding to the data processor die.

19. An apparatus, comprising;
a data processor die mounted on a chip substrate;
a non-volatile data storage die mounted on the chip substrate and distinct from the data processor die, wherein the non-volatile data storage die stores wafer, x, y data and a manufacturer code corresponding to the data processor die;
a first data bus coupled directly to the non-volatile data storage die;
a second data but coupled directly to the non-volatile data storage bus, wherein the first data bus is a different bus than the second data bus; and
logic for:
collecting of data corresponding to an operational history of the data processor die, wherein the logic for collecting of data is incorporated into the data processor die;

transmitting data collected by the logic for the collection of data to the data storage die over the first data bus; and accessing the collection of data on the data storage die via a second data bus coupled directly to the non-volatile data storage die, wherein the collected data is accessible via the second data bus while the data processor die and the first data bus are inoperable; and wherein the data corresponding to the operational history of the data processor die is one or more of a list, comprising:

a number of computing cycles executed by the data processor die;

an elapsed. power-on time;

environmental conditions associated with operation of the data processor die;

a time of a last power cycle;

a data and time of an error associated with the data processor die; and error register values.

\* \* \* \* \*